June 20, 1944.  P. S. MORGAN  2,351,996
COUPLING
Filed Aug. 3, 1940   2 Sheets—Sheet 1

INVENTOR.
PORTER S. MORGAN
BY *N. Philip Churchill*
ATTORNEY.

June 20, 1944. P. S. MORGAN 2,351,996
COUPLING
Filed Aug. 3, 1940 2 Sheets-Sheet 2
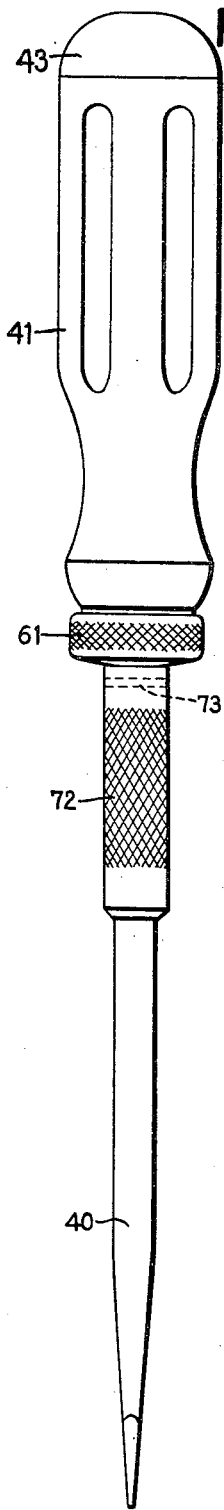
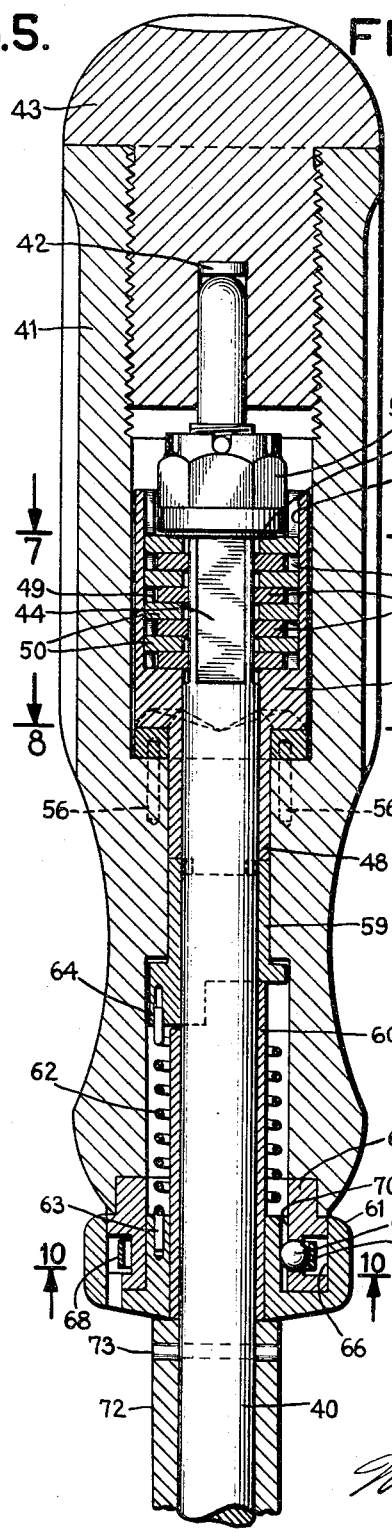
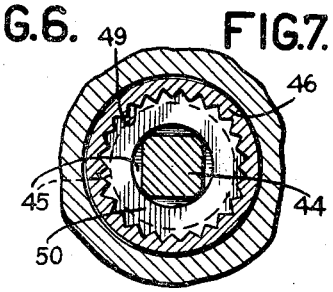
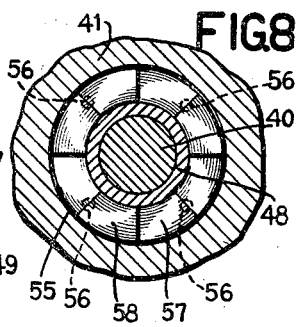
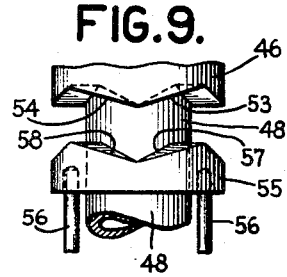
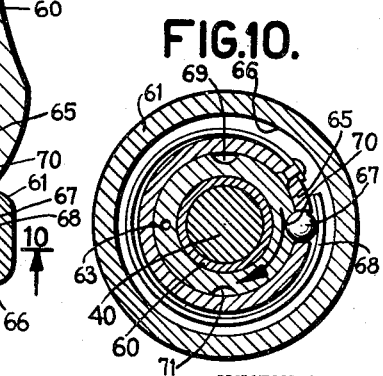
INVENTOR.
PORTER S. MORGAN
ATTORNEY.

Patented June 20, 1944

2,351,996

UNITED STATES PATENT OFFICE 2,351,996

COUPLING

Porter S. Morgan, Weston, Conn., assignor to The Capewell Manufacturing Company, Hartford, Conn., a corporation of Connecticut Application August 3, 1940, Serial No. 350,938

12 Claims. (Cl. 192—54)

This invention relates to friction drive couplings. In one of the embodiments described herein, it is shown as it may be applied to driving and driven shafts generally; in another embodiment, it is shown incorporated in a screwdriver. But it will be understood that it may be incorporated into a wide variety of devices, including tools, such as bit braces, drills, etc.

One object of the present invention is to provide a coupling between a driving shaft and a driven shaft whereby these shafts may be automatically connected together in driving relation through a plurality of friction surfaces when the driving shaft is rotated in one direction and automatically disconnected when the driving shaft is rotated in the opposite direction so that the driving shaft is free to rotate without causing the driven shaft to rotate.

The arrangement is such that the driving connection between the two shafts may be effected practically simultaneously with the beginning of rotation of the driving shaft in one direction and may be "broken" as quickly when the driving shaft is rotated in the opposite direction.

An important advantage of the present construction is that the wearing of the various parts in the coupling is reduced to a minimum.

A further object is to provide a coupling in which the driving and driven shafts may be brought into driving connection when the driving shaft rotates in either of two directions, such driving connection being broken when the driving shaft is rotated in the opposite direction, an adjustment also being provided whereby the driving and driven shafts may be maintained in driving connection to each other regardless of the direction in which the driving shaft rotates.

Figure 1:
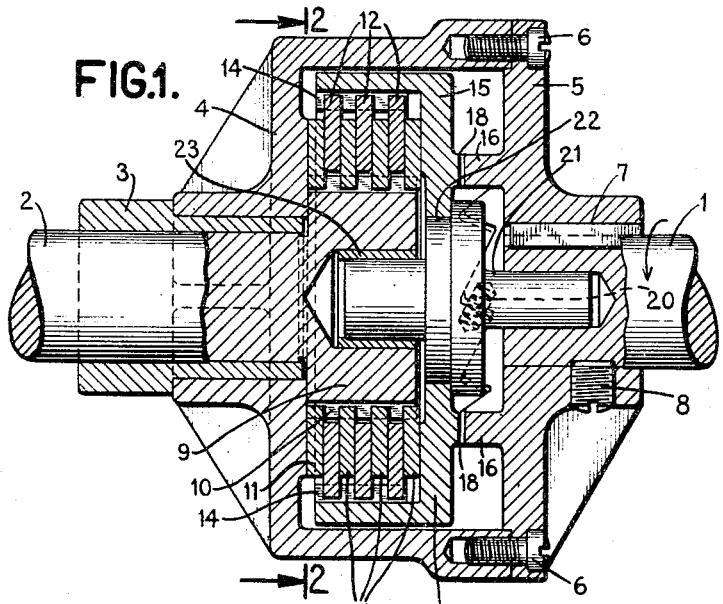
Figure 4:
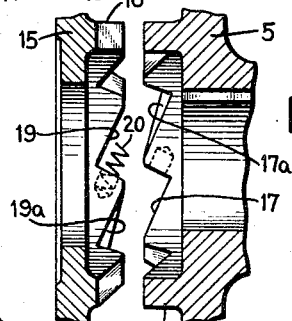
Figure 2:
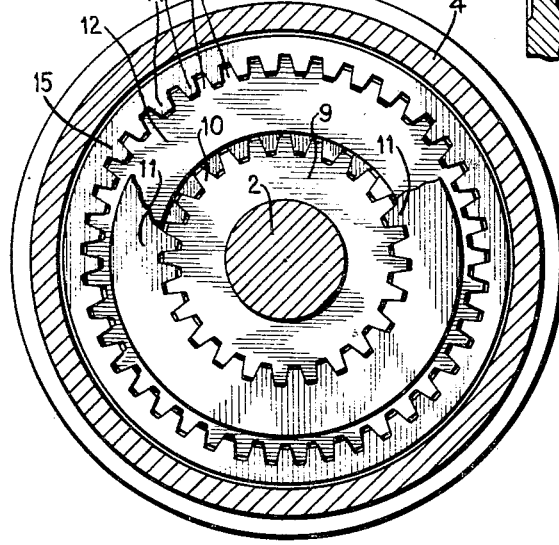
Figure 3:
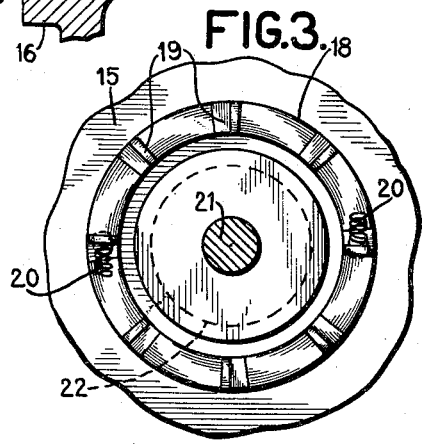

Further objects of the invention will be apparent and the invention will be better understood from the following description taken in conjunction with the drawings in which Fig. 1 is a cross-sectional view through a preferred embodiment of the invention as applied to a pair of driving and driven shafts, Fig. 2 is a cross-sectional view taken along the line 2—2 of Fig. 1, Fig. 3 is a face view of one of the cam members, Fig. 4 is a partial sectional view showing the two cooperating cam surfaces.

Fig. 5 is an elevational view of a screwdriver embodying another modification of the present invention, Fig. 6 is a longitudinal cross-sectional view through the handle and upper portion of the shank, Fig. 7 is a cross-sectional view taken along the line 7—7 of Fig. 6, Fig. 8 is a partial cross-sectional view taken along the line 8—8 of Fig. 6, looking down on one of the cam members, Fig. 9 shows the complementary cam surfaces, and Fig. 10 is a cross-sectional view taken along the line 10—10 of Fig. 6.

Referring to Fig. 1, the shaft 1 projecting from the right hand side of the coupling is the driving shaft and the shaft 2 on the left is the driven shaft. The latter is provided with a bushing 3 of bronze, or other suitable material, having a reduced portion which is press-fitted into the circular housing 4, as illustrated. This housing is closed by a cover plate 5 secured to the member 4 by the bolts 6. The cover 5 is fastened to the driving shaft 1 by means of the key 7 so that the housing members 5 and 4, and the bushing 3, rotate with the driving shaft 1 while the driven shaft may remain stationary. The set screw 8 prevents the housing from moving lengthwise of the shafts.

The end of the driven shaft which projects into the coupling housing may be provided with an enlarged portion 9 having a circumferential series of teeth 10 cut therein as clearly illustrated in Fig. 2. Four annular clutch plates 11, which may be made of steel, are slidably mounted upon the driven shaft so that the teeth formed in their inner peripheral edges engage in the teeth 10 on the driven shaft as illustrated in Figs. 1 and 2. Thus these four clutch plates which are spaced along the enlarged end of the driven shaft, as shown in Fig. 1, are free to slide along the shaft but must rotate with it. While the cooperating teeth referred to above resemble spur gear teeth, it will be readily understood that since there is no relative rotation between the members having these teeth, various other arrangements for "feathering" the clutch plates may be used.

The clutch plates 11 are adapted to engage three annular clutch plates 12, preferably bronze, having teeth 13 cut in their outer peripheries for slidable mounting in the teeth 14 cut in the ring member 15. Thus, as this ring member is rotated, as hereinafter described, it causes the clutch plates 12 to rotate with it but such plates are free to slide lengthwise of the shaft axis.

It will be observed from Fig. 1 that the end clutch plates 11 are adapted to engage frictionally with the housing member 4 and the ring member 15, while the plates 12 are engaged between the plates 11. The means for moving the several parts lengthwise of the shaft axis to bring about this clutching action will now be described.

The housing cover 5 is provided with an inwardly extending annular projection 16 having a circumferential series of camming surfaces 17 cut therein as illustrated in Figs. 3 and 4. The ring member also has an annular projection 18 having a complementary series of camming surfaces 19 adapted to engage the surfaces 17. As represented at 17a and 19a in Fig. 4, the contacting surfaces are helical so that one surface may slide along the other as the housing cover 5 is rotated relatively to the ring member 15. Two springs 20 normally tend to rotate one series of cams relative to the other so that the camming surfaces 17 and 19 tend to remain in contact with each other.

The ring member 15 is supported on a stud 21 provided with a collar 22 on which the member 15 may be press-fitted. As shown in Fig. 1, one end of this stud projects into the end of the driving shaft 1, being free to turn therein and the other end rotates in a bushing 23 in the end of the driven shaft 2.

The operation of the coupling may now be described:

As power is applied to rotate the driving shaft 1 in the direction of the arrow shown in Fig. 1, the cover member 5 keyed thereto is caused to rotate and carries with it the clutch housing 4 and the bushing 3. Also, the camming surfaces 17 on the cover member 5, being in contact with the complementary cam surfaces 19 on the ring member 15, cause the latter and the clutch plates 12 carried thereby to rotate.

Disregarding for the moment the inertia of the parts, including the driven shaft 2, it will be understood that the clutch plates 12 and friction surfaces on the housing member 4 and on the ring member 15, will be free to rotate with respect to the driven clutch plates 11, in the absence of any axial pressure tending to force these various friction surfaces into operative engagement. Actually, however, the inertia of the ring member 15, and the clutch plates 12, together with the resistance of the driven shaft to rotation, causes the cam surfaces 17 on the cover 5 to move slightly along the cam surfaces 19 on the ring member 15. Such movement, as will be readily understood, forces the ring member toward the left as shown in Fig. 1, thereby bringing all of the clutch plates into operative engagement and thus causing the driven shaft to rotate.

It will be appreciated that such engagement of the clutch elements occurs with extreme rapidity so that the driven shaft is caused to rotate almost instantaneously with the application of power to the driving shaft.

When the driving shaft is rotated in the direction opposite to that indicated by the arrow in Fig. 1, the cover 5 will, of course, be rotated in the same direction as the driving shaft. Due to the momentum of the ring member 15, the clutch plates 11 and 12 and the driven shaft 2, if the latter be rotating, or the inertia of these parts if the driven shaft be stationary, cam surfaces 17 will slide downwardly and to the left along the cam surfaces 19, as represented in Figs. 1 and 4, so that the axial pressure exerted on the clutch plates will be released, thereby destroying the operative connection between the driving and driven elements. Accordingly, the driving shaft may be rotated in the direction opposite to the arrow without imparting rotation to the driven shaft.

However, it will be appreciated by those skilled in the art that if, instead of having the cam surfaces 17 and 19 in the form of simple right hand spirals as shown in Figs. 1 and 4, these cooperating cam surfaces were divided so as to have both right hand and left hand spirals, the cam surfaces could be shifted relative of one another so as to produce a driving relation between the two shafts when the driving shaft was rotated in either of two directions and to "break" such connection when the driving shaft was rotated in the opposite direction. Also, the movement of the cam surfaces may be so controlled that the driven shaft may be caused to rotate whenever the driving shaft is rotated.

The screwdriver, now to be described with reference to Figs. 5-10, inclusive, embodies those features.

The round shank 40 is flattened at one end for insertion in the head of a screw in the usual manner, and extends into the handle 41 and is provided with a round end adapted to bear against the hardened plate 42 inserted in the plug 43, screwed or otherwise inserted in the end of the handle. A portion of the shank, designated as 44 may be, and preferably is, provided with a square cross-section as shown in Fig. 7. Upon this squared section a series of clutch plates 45 having complementary shaped central openings are slidably mounted, four such plates being shown in Fig. 6. It is obvious, however, that either a greater or lesser, number of plates may be used as found desirable. The clutch plates 45 rotate with the shank 40 but are free to slide lengthwise of the squared section 44.

A cylindrical clutch housing 46 is provided with an enlarged central opening 47 surrounding the squared portion 44 of the shank and has a depending sleeve portion 48 encircling the round section of the shank. The central opening 47 may be fluted or otherwise provided with a series of teeth, one form of which is represented at 49 in Fig. 7.

A series of clutch plates 50 having complementary fluted, or toothed, outer peripheries are slidably mounted in the central opening 47, alternating with the clutch plates 45 previously described. The clutch plates 50 must rotate whenever the clutch housing 46 is rotated but are capable of movement lengthwise of the shank. This assembly of clutch plates may be confined between the shoulder at the bottom of the central opening 47 and the washer 51 held in place by the castellated nut 52 screwed on the shank 40. The nut is so positioned that the plates may have a slighth longitudinal movement with respect to each other.

As more clearly shown in Fig. 9, the lower edge of the clutch housing 46 is provided with right hand and left hand spiral camming surfaces 53 and 54, respectively. An annular cam member 55 surrounds the depending sleeve portion 48 of the clutch housing and is secured to the handle 41 by means of the pins 56. As also shown in Fig. 9, the upper surface of the member 55 is provided with complementary cam surfaces 57 and 58, adapted to engage with the surfaces 53 and 54, respectively, on the clutch housing 46

It will be readily understood that when the handle 40 is rotated so that the cam member 55 affixed thereto, rotates relatively to the clutch housing 46, the cam surfaces 53—57 and 54—58 will slide along one another in directions depending upon the direction of rotation of the handle. The resulting camming action will raise the clutch housing 46, thereby causing the clutch plates 45 and 50 to engage each other frictionally, so that continued rotation of the handle 41 rotating the cam element 55, and the clutch housing 46 will cause the clutch plates 50 to rotate clutch plates 45, which in turn rotate the shank of the screw driver.

Mechanism for controlling the driving relations between the handle 41 and the shank 40 may be, and preferably is, contained in the lower part of the handle. The sleeve 59 rotatable on the shank 40 is splined to the sleeve 48 depending from the clutch housing 46, so that any tendency of the sleeve 59 to rotate, as hereinafter described, will be transmitted to the clutch housing 46. The lower end of the sleeve 59 is splined to the sleeve 60. A knurled collar 61 encircles the lower end of the sleeve 60 and has one end of a spiral spring 62 affixed thereto, as indicated at 63, the upper end of the spring being secured in the sleeve 59, as indicated at 64. An annular member 65 inserted in the lower end of the handle projects into an annular recess 66 in the collar 61, and is rotatable with respect thereto. As indicated in Figs. 6 and 10, the collar 65 carries a ball 67 which is normally urged toward the shank axis by the coil spring 68. The collar 61 has three grooves 69, 70 and 71, each of which is adapted to receive the ball 67 when the latter is brought into alignment by rotation of the collar 61. A knurled sleeve 72 secured to the shank 40 by a pin 73 may be held with one hand while the collar 61 is rotated by the other hand.

The complete operation of the screw driver may be described as follows:

When the ball 67 is in the middle groove 70, as shown in Fig. 10, the shank 40 will rotate whenever the handle 41 is rotated. With the parts in this position there is no torsion on the spring 62 and hence there is no force tending to rotate the clutch housing 46 with respect to the cam member 55 affixed to the handle. Accordingly, whenever the handle is rotated in either direction the cam surfaces 53 and 54 slide either up or down the cam surfaces 57 and 58, respectively, depending upon the direction of rotation, due to the resistance of the shank to turning by virtue of its engagement with the screw. Such action forces the clutch plates into frictional engagement with each other which, as previously explained, causes the shank to rotate.

Whenever the knurled collar 61 is turned so that the ball 67 is placed in either the groove 69, or the groove 71, the handle 41 will cause the shank to rotate when rotated in one direction, but the handle may be rotated freely without rotating the shank, when rotated in the opposite direction. Such operation results because the spring 62 is under torsion, tending to rotate the sleeve 59 and the clutch housing 46, in one direction, or the other, with respect to the cam member 55 fixed to the handle. When the handle is rotated in a direction opposite that in which the clutch housing tends to rotate, some of the cam surfaces on the clutch housing 46 will slide up the cooperating cam surfaces on the cam member 55 so as to engage the clutch plates, thus causing the shank to rotate. But when the handle is rotated so that the cam member 55 fixed to it rotates in the same direction in which the clutch housing 46 tends to rotate, the latter will rotate with the cam member 55 so that there will be no axial displacement of the clutch housing and, therefore, no operative engagement between the various clutch plates. Accordingly, the shank will not be rotated during such movement of the screwdriver handle.

It will be readily appreciated by those skilled in the art that various modifications and changes may be made in the constructions hereinabove described without departing from the spirit and scope of the present invention as set forth in the following claims.

I claim:

1. A shaft coupling between a driving shaft and a driven shaft comprising, a housing rotatable with respect to the driven shaft, a cover for said housing rotatable with the driving shaft and adapted to rotate said housing, a series of clutch plates rotatable with the driven shaft, an annular member within said housing and rotatable with the driving shaft, a series of clutch plates rotatable with said annular member, said clutch plates being adapted to engage frictionally with said first series of clutch plates, and camming means for moving said annular member axially to engage, or disengage, the two series of clutch plates, to rotate the driven shaft, or permit it to remain stationary, respectively, while the driving shaft rotates in one direction, or the other.

2. A shaft coupling between a driving shaft and a driven shaft comprising, a housing rotatable with respect to the driven shaft, a cover fixed to said housing and rotatable with said driving shaft, a series of clutch plates slidably mounted upon the driven shaft but rotatable therewith, an annular member within said housing, a series of clutch plates slidably mounted in said annular member but rotatable therewith and adapted to engage frictionally with the first series of clutch plates, said cover and said annular member being provided with complementary cam surfaces adapted to impart rotation to said annular member and to move said member axially to engage, or disengage the two series of clutch plates, to rotate the driven shaft, or permit it to remain stationary, respectively, while the driving shaft rotates in one direction, or the other.

3. A shaft coupling between a driving shaft and a driven shaft comprising, a series of clutch plates rotatable with the driven shaft, a cam member rotatable with the driving shaft, an axially movable annular member positioned intermediate said shafts, a series of axially movable clutch plates rotatable with said annular member, a supporting member rotatable in each of said shafts and adapted to support said annular member, and means coacting with said cam member whereby said annular member may be moved axially and rotated, thereby forcing said two series of clutch plates into frictional engagement to drive said driven shaft.

4. A tool having a rotatable shank and a handle and comprising, a series of frictional members rotatable with the shank, a second series of frictional members adapted to engage frictionally the first series in common rotation, or to be disengaged, so as to rotate with respect to said first series, means for so engaging or disengaging such members, said means including a cam element associated with the handle and a second cam element associated with said shank and rotatable by the first but adapted to rotate in relation thereto, and spring actuated means for urging said cam elements into contact with each other.

5. A tool having a rotatable shank and a handle and comprising, a series of frictional members rotatable with the shank, a second series of frictional members slidable into, or out of, engagement with the first series to rotate said shank, or to permit it to remain stationary, means for so sliding the frictional members including, a camming surface movable with the handle, a complementary camming surface movable with said second series of frictional members, and spring means for holding said camming surfaces in contact with each other.

6. A screwdriver having a rotatable shank and a handle and comprising, a series of frictional members rotatable with the shank, a second series of frictional members slidable into, or out of, engagement with the first series to rotate said shank, or to permit it to remain stationary, means for so sliding the frictional members including camming surfaces inclined in opposite directions and movable with the handle, complementary camming surfaces movable with said second series of frictional members, and means for selecting the direction of rotation of said shank, said means including mechanism settable to positions tending to rotate said cam surfaces relative to each other.

7. A screwdriver having a rotatable shank and a handle and comprising, a series of frictional members rotatable with the shank, a second series of frictional members slidable into, or out of, engagement with the first series to rotate said shank, or to permit it to remain stationary, means for so sliding the frictional members including camming surfaces inclined in opposite directions and movable with the handle, complementary camming surfaces movable with said second series of frictional members, and means for selecting the direction of rotation of said shank, said means including a resilient member, a member adjustable in several positions, one of which exerts no force on said resilient member, others of such positions exerting forces on said member, thereby tending to rotate said cam surfaces relative to each other, such relative movement engaging, or disengaging, the frictional members.

8. A coupling for connecting a rotatable driving element to a rotatable driven element comprising a plurality of friction members connected to and rotating with the driven element, a second set of friction members disposed between said first friction members for interengagement therewith, a rotatable housing element shiftable axially and directly connected for rotation with said second set of friction members, cam surfaces on said housing element, and complemental cam surfaces connected to the driving element for shifting the housing member to cause engagement between the sets of friction members when the driving element is rotated in one direction relative to the driven element.

9. A coupling for connecting a rotatable driving element to a rotatable driven element comprising a set of axially shiftable friction plates having a positive driving connection with the driven element, a second set of axially shiftable friction plates having a positive driving connection with the driving element, said sets of plates being alternately disposed in engagement with each other, means including two sets of camming surfaces inclined in opposite directions on the driving element for forcing said plates together axially into frictional engagement when the driving element is rotated in one direction relative to the driven element and for releasing said sets of plates for independent rotation when the driving element is rotated in the other direction relative to the driven element, and adjustable means for rendering one set of said camming surfaces temporarily inoperative.

10. A coupling for connecting a rotatable driving element to a rotatable driven element comprising a set of axially shiftable friction plates having a positive driving connection with the driven element, a second set of axially shiftable friction plates having a positive driving connection with the driving element, said sets of plates being alternately disposed in engagement with each other, means including oppositely inclined camming surfaces on the driving element for forcing said plates together axially upon relative rotation of the driving element in either direction, and spring actuated means adjustable to different positions for preventing said forcing action of either one of said oppositely inclined camming surfaces.

11. A tool having a rotatable shank and a handle and comprising: a series of frictional members rotatable with the shank; a second series of frictional members slidable into and out of engagement with said first series to rotate said shank or to permit it to remain stationary; means for sliding said frictional members into and out of engagement, said means including camming surfaces inclined in opposite directions and movable with the handle, and complementary camming surfaces movable with said second series of frictional members; and means for adjusting said camming elements to permit rotation of said shank in only one direction.

12. A coupling for connecting a rotatable driving element to a rotatable driven element comprising a plurality of friction members connected to and rotating with the driven element, a second set of friction members disposed between said first friction members for interengagement therewith, axially movable means positively rotated by said driving element and positively rotating said second set of members, and cam means operable by a slight relative rotation in one direction between said driving and driven elements for moving said axially movable means to engage said sets of friction members, said cam means including a spring so positioned that the camming surfaces of said cam means are urged into engagement.

PORTER S. MORGAN.